Figure 1:
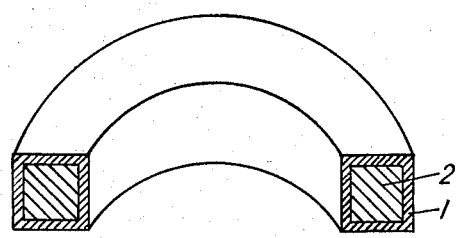

Feb. 9, 1960

YOZO SASAKI ET AL 2,924,573

PROCESS OF MAKING MANGANESE-ZINC-FERRITE

Filed May 3, 1957

2 Sheets-Sheet 1

Inventor
Y. Sasaki - T. Hamada
By John M. Calmafde
Attorney

United States Patent Office 2,924,573
Patented Feb. 9, 1960

2,924,573
PROCESS OF MAKING MANGANESE-ZINC-FERRITE

Yozo Sasaki and Toshio Hamada, Tokyo, Japan, assignors to International Standard Electric Corporation, New York, N.Y., a corporation of Delaware Application May 3, 1957, Serial No. 656,977

Claims priority, application Japan May 10, 1956

4 Claims. (Cl. 252—62.5)

This invention relates to manganese-zinc ferrites and more particularly to a method for increasing the permeability and reducing the losses of such ferrites.

Ferrites have become well known in the electronic industry and for many applications ferrites have replaced metallic magnetic materials. Ferrites are particularly useful for very high frequency applications because of their high permeabilities and high electrical resistivities ranging from $10^{-1}$ ohm-cm. to $10^9$ ohm-cm.

Ferrites may be classified as hard or soft; the hard ferrite having a high coercivity suitable for permanent magnets and the soft ferrite having a low coercivity and suitable for inductance cores and the like. Among the magnetically soft ferrites are manganese-zinc ferrites, nickel-zinc ferrites, copper-zinc ferrites and others. Of these, the manganese-zinc ferrites have enjoyed most extensive use because of their high initial permeability and low core losses within a frequency band of several kilocycles (kc.) to several hundred kc.

Many techniques for manufacturing manganese-zinc ferrites are known and disclosed in the literature. For example, one very satisfactory process is disclosed in French Patent 1,093,965, issued December 1, 1954.

Generally, the manganese-zinc ferrite comprises a mixture of 25–40 mol percent MnO, 10–25 mol percent ZnO and the remainder $Fe_2O_3$. In the preparation of the ferrite, the composition is calcined at temperatures between 800° and 1300° C., pressed into a desirable shape and then sintered in a suitable atmosphere at a temperature between 1100°–1350° C. A suitable atmosphere may be air, pure nitrogen, or nitrogen containing a small percent of oxygen. By pure nitrogen we mean, nitrogen containing less than 0.1% oxygen. The ferrite is cooled at a rate which depends largely on the atmosphere. If the atmosphere is air, the rate of cooling is rapid, e.g., more than 400° C. per hour and at times 1000° C. per hour, whereas if the atmosphere is nitrogen, the rate of cooling is slower, e.g., between 100°–300° C. per hour. Although pure nitrogen may be used it will not be referred to hereinafter because presently its cost renders it impractical.

Manganese-zinc ferrites have initial permeabilities ($\mu_0$) between 500 and 4000, with a quality factor (Q) between 50 and 300 in a weak magnetic field. We have found that manganese-zinc ferrites, whether cooled rapidly in air, or cooled slowly in nitrogen containing a small percentage of oxygen, consist of a surface layer and a sub-surface portion which constitutes the remaining portion of the ferrite. The formation and thickness of the surface layer is a result of oxygen adsorption and is a function of the oxygen content in the cooling atmosphere and the degree of porosity of the ferrite.

We have found that the initial permeability of the surface layer may range from ten to a few hundred whereas the initial permeability of the sub-surface portion may range from 1500 to 4000.

It is an object of our invention to provide a process for increasing the permeability of a manganese-zinc ferrite by liberating the adsorbed gases and preventing re-adsorption of the gases into the ferrite.

In accordance with an aspect of our invention, the permeability is increased by heating the ferrite in a vessel substantially evacuated of air, at a temperature between 800° and 1220° C. to liberate the adsorbed gases from the ferrite, while maintaining the pressure in the vessel below .5 mm. Hg.

Figure 2:
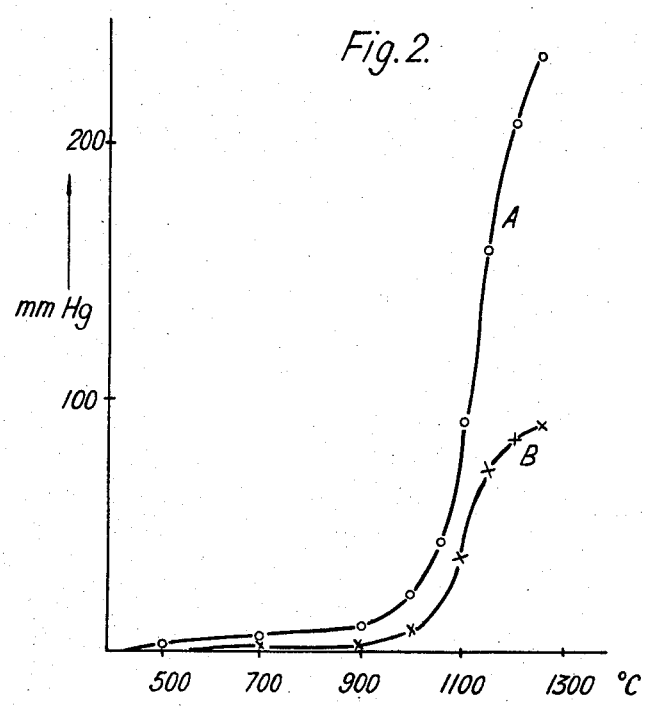
Figure 3:
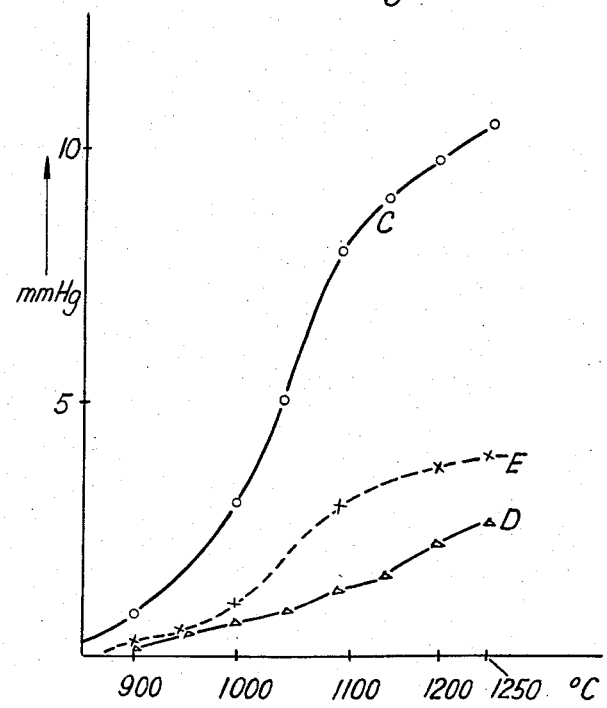

The above-mentioned and other features and objects of this invention will become apparent by reference to the following description taken in conjunction with the accompanying drawings, in which:

Figure 1 is a cross-sectional view of a toroidal core showing the surface layer and the sub-surface portion of the ferrite, and Figures 2 and 3 are curves of gas pressures produced by different samples of ferrites placed in an evacuated vessel and subjected to different temperatures.

Referring first to Figure 1, there is shown a toroidal core comprising a surface layer 1 and a sub-surface portion 2. The thickness of the surface layer is ranging from 0.1 mm. to several millimeters.

Referring now to Figures 2 and 3, the illustrated curves are plots of gas pressures produced by several different samples of a manganese-zinc ferrite against temperature. The composition of the several samples was approximately the same comprising 52.6 mol percent $Fe_2O_3$, 27 mol percent MnO and 20.4 mol percent ZnO. However, the heat treating atmosphere was different for each of the several samples.

Curve A illustrates the pressure-temperature characteristic for a ferrite of the above-mentioned composition slowly cooled in air for 4 hours from 1200° C. The initial permeability of sample A prior to the evacuation process was 8. The sample was then placed in a vessel and after the vessel was evacuated to a pressure below $10^{-3}$ mm. Hg it was heated. At a temperature below 900° C. the sample liberated primarily $CO_2$, and above 900° C. the sample liberated oxygen.

The amount of liberated oxygen under normal temperature and pressure (NTP) was 7.8 cc. per gram of ferrite. This amount corresponds to the amount of oxygen absorbed by a ferrite heat treated in air when approximately 65% MnO is converted to $Mn_2O_3$. The permeability of the ferrite after gas liberation at 1000° C. was 53.

Curve B illustrates the pressure-temperature characteristic of a sample having the above-mentioned composition and heat treated similarly to sample A. However, sample B was reheated for one hour at 1200° C. in a nitrogen atmosphere containing 0.5% oxygen. The ferrite was then subjected to the same gas liberation process as in sample A. It is seen from the curve that the amount of liberated gas decreased substantially. The permeability of sample B is prior to gas liberation was 140 and after gas liberation the permeability increased to 660.

Curve C of Figure 3 is for a sample which was sintered for four hours at 1250° C. and slowly cooled in a stream of nitrogen containing 0.5% oxygen. The initial permeability of the sample prior to the liberation of oxygen was 1380 and after the liberation process the initial permeability increased to 2880. Curve D shows the gas liberation for the same sample with the outer surface layer ground-down about 1 mm. Prior to the liberation process, the initial permeability of the surface layer was 640 and the initial permeability of the sub-surface portion was 2250. After the liberation process the initial permeability of the sub-surface portion increased to 2950.

Curve E is a curve for a sample which was sintered for four hours at 1270° C. and slowly cooled in nitrogen containing about 0.1% oxygen. The initial permeability prior to the liberation of oxygen was 2750 and after the liberation of oxygen it was 3480.

The amounts of liberated oxygen as indicated in curves C, D and E correspond to the amount absorbed by the ferrite when 3.5%, 1.0% and 2.5% MnO are converted to $Mn_2O_3$ respectively. The sample producing curve A was examined by microscopic analysis and it was observed that the conversion of MnO to $Mn_2O_3$ caused the $Mn_2O_3$ to precipitate into fine crystals. In samples C, D, and E however, crystalline precipitation could not be detected. Therefore, it is reasonable to believe that in the latter samples the excess oxygen dissolved into the ferrite, or that a semi-conductor is formed of the metal-ion defect or oxygen-ion excess type.

Thus, our invention has greater utility for those ferrites in which less than 10% of the MnO was converted into $Mn_2O_3$. Such ferrites are those which were either produced in an atmosphere of pure nitrogen, of nitrogen containing a small percentage of oxygen and in which the rate of cooling was slow, or in which the ferrite was rapidly cooled in air.

By way of example, an Mn-Zn ferrite comprising 54 mol percent $Fe_2O_3$, 35 mol percent MnO and 11 mol percent ZnO, was heated for four hours at 1200° C. in a stream of nitrogen containing approximately .05–.07% oxygen. The ferrite was cooled in the same atmosphere at the rate of 100° C. per hour. The characteristics of the ferrite were as follows:

$\mu_0$ ------------------------- 1510
$Q$ ------------------------- 107.8 (at 100 kc.)
$l/\mu Q$ ------------------------- $6.15 \times 10^{-6}$ (at 100 kc.)
$h/\mu^2$ ------------------------- $842 \times 10^{-6}$
$Fn/\mu$ ------------------------- $0.137 \times 10^{-3}$
$t/\mu$ ------------------------- $13.2 \times 10^{-3}$ The losses may be derived from Jordon's formula as follows:

$$\frac{R_p}{L} = Fn\frac{f^2}{800^2} + h\frac{NI}{l}\cdot\frac{f}{800} + t\frac{f}{800}$$

where:

$R_p$ = loss in ferrite expressed in resistance
$L$ = the inductance of the coil
$Fn$ = the eddy current loss coefficient
$f$ = frequency
$N$ = number of turns in the coil
$I$ = effective value of the current in the coil
$l$ = mean length of the magnetic path
$h$ = the hysteresis loss coefficient
$t$ = residual loss coefficient The sample was then heated in an evacuated vessel at a temperature of 1000° C., the vessel having a vacuum of the order of $10^{-1}$ mm. Hg. The sample was subjected to this treatment for about thirty minutes and then slowly cooled at the rate of 100° C. per hour while maintaining the vacuum in the vessel at $10^{-1}$ mm. Hg. The characteristics of the treated ferrite were as follows:

$\mu_0$ ------------------------- 2,580
$Q$ ------------------------- 88.1 (at 100 kc.)
$l/\mu Q$ ------------------------- $4.24 \times 10^{-6}$ (at 100 kc.)
$h/\mu^2$ ------------------------- $200 \times 10^{-6}$
$Fn/\mu$ ------------------------- $0.145 \times 10^{-3}$
$t/\mu$ ------------------------- $5.2 \times 10^{-3}$ Thus, by liberating the gas the initial permeability has increased 40%, while the hysteresis and residual losses have materially decreased. The eddy current loss is slightly higher because of the decrease in the apparent electric resistance. The apparent electric resistance of a ferrite heat treated in an atmosphere containing nitrogen varies inversely with the sintering temperature. The specific resistance of a sample sintered at 1250° C. is about 1000 ohms-cm. This resistance is reduced to about 25 ohm-cm. by the evacuation process. Thus, if a small eddy current loss is desired, heating in a stream of nitrogen should be conducted at a temperature below 1220° C.

A second ferrite having the same composition as in the previous example was heated in a nitrogen atmosphere containing 0.1% oxygen, for 4 hours at 1150° C., and then slowly cooled. The characteristics were:

$\mu_0$ ------------------------------------- 789
$Q$ ------------------------------ 135 (at 100 kc.)

The ferrite was then placed in an evacuated vessel having a pressure of the order of 0.01 mm. Hg and heated for two hours at 900° C. while maintaining the pressure. The characteristics of the ferrite after gas liberation were:

$\mu_0$ ------------------------------------ 1120
$Q$ ------------------------------ 125 (at 100 kc.)

It is observed that for a ferrite sintered in nitrogen at a temperature less than 1200° C., the decrease in Q as a result of gas liberation is slight.

A third ferrite of the same composition as the two above-mentioned ferrites, was sintered in air and cooled rapidly in a closed container where the circulation of air was inhibited. The characteristics were:

$\mu_0$ ------------------------------------- 925
$Q$ ------------------------------ 106 (at 100 kc.)

The ferrite was then placed in an evacuated vessel having a pressure of 0.01 mm. Hg and heated for 30 minutes at 1000° C. while maintaining the pressure. The characteristics were:

$\mu_0$ ------------------------------------ 1220
$Q$ ------------------------------------------- 85

The results of the tests indicate that the time necessary for the gas liberation process varies inversely with the temperature. For example, the time necessary to complete the process at 1000° C. is about 10 minutes, whereas below 900° C. it requires considerably more time. However, if the temperature exceeds 1100° C. a gas must be streamed into the vessel to prevent the evaporation of ZnO, or the time for the process must be considerably reduced.

The ferrite may be placed in any vessel which does not react with the ferrite or which does not liberate a gas at the heat treating temperatures. One suitable material for the vessel is quartz.

While we have described above the principles of our invention in connection with specific compositions, it is to be clearly understood that this description is made only by way of example and not as a limitation to the scope of our invention as set forth in the objects thereof and in the accompanying claims.

We claim:

1. A process of making a ferrite, comprising mixing 25–40 mol percent MnO, 10–25 mol percent ZnO, the balance being substantially $Fe_2O_3$, sintering said mixture at a temperature between 1100–1350° C. to form a ferrite, and then heating said ferrite to a temperature between 900° C. and 1200° C., under pressure of less than 0.5 mm. Hg, for a period dependent on said temperature, to liberate occluded oxygen from the ferrite surface.

2. The process according to claim 1, wherein the temperature is maintained below 1100° C. and the pressure maintained at less than 0.1 millimeter of mercury.

3. The process according to claim 1, wherein the sintering atmosphere consists essentially of nitrogen containing less than 0.5% oxygen.

4. The process according to claim 1, wherein the sintering atmosphere is air.

(References on following page)

References Cited in the file of this patent

UNITED STATES PATENTS

| | | |
|---|---|---|
| 2,452,531 | Snoek | Oct. 26, 1948 |
| 2,549,089 | Hegyi | Apr. 17, 1951 |
| 2,579,978 | Snoek et al. | Dec. 25, 1951 |
| 2,597,469 | Gatzka | May 20, 1952 |
| 2,705,701 | Crowley | Apr. 5, 1955 |
| 2,723,238 | Simpkiss | Nov. 8, 1955 |
| 2,764,552 | Buckley et al. | Sept. 25, 1956 |
| 2,856,365 | Heck et al. | Oct. 14, 1958 |

FOREIGN PATENTS

| | | |
|---|---|---|
| 669,571 | Great Britain | Apr. 2, 1952 |
| 1,093,965 | France | Dec. 1, 1954 |

OTHER REFERENCES

"Proceedings of the IRE," vol. 44, No. 10, October 1956, pp. 1304–1306.